(No Model.)

L. W. CROSTA.
LOCKING NUT FOR SCREW BOLTS.

No. 510,120. Patented Dec. 5, 1893.

Witnesses
Chas H. Smith
Geo. T. Pinckney

Inventor
L. W. Crosta
per Lemuel W. Serrell
Atty

UNITED STATES PATENT OFFICE.

LORENZO WILLIAM CROSTA, OF WEST BRIDGEFORD, ENGLAND.

LOCKING-NUT FOR SCREW-BOLTS.

SPECIFICATION forming part of Letters Patent No. 510,120, dated December 5, 1893.

Application filed April 3, 1893. Serial No. 468,767. (No model.) Patented in England January 2, 1892, No. 95.

*To all whom it may concern:*

Be it known that I, LORENZO WILLIAM CROSTA, a subject of the Queen of Great Britain and Ireland, residing at West Bridgeford, in the county of Nottingham, England, have invented new and useful Improvements in Nuts for Screw-Bolts and the Like, (for which I have obtained a patent in Great Britain, No. 95, bearing date January 2, 1892,) of which the following is a specification.

This invention relates to improvements in nuts for screw-bolts and the like.

According to my invention the nut is formed at its upper or outer part with a vertical cut or division, preferably diametrically across it at a slight angle and parallel with the axis of the bolt, rod, or the like, and extending to a suitable depth so as to partially divide the nut into two portions or halves. Before punching and tapping the nut, one of the halves or portions is pressed, forced, or bent over in the direction of the division or across the other portion, and after the nut has been punched and tapped, said half or portion is returned to its original position. This will cause the part of the hole in one half of the nut to be eccentric to that in the other portion, and to be inclined, for about half the depth of the nut, to the axis of the bolt, rod, or the like, and to the corresponding part of the hole in the other half.

In order that my invention may be readily understood, I will describe the same fully with reference to the annexed drawings, in which—

Figure 1:
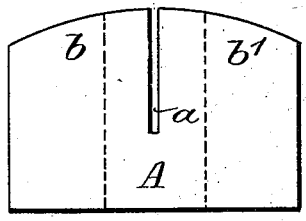
Figure 3:
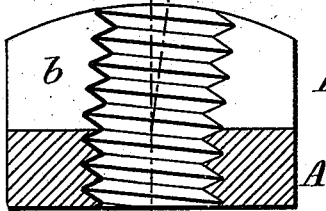
Figure 2:
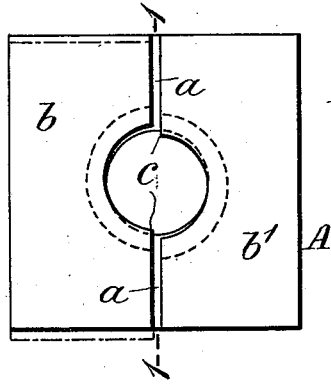
Figure 4:
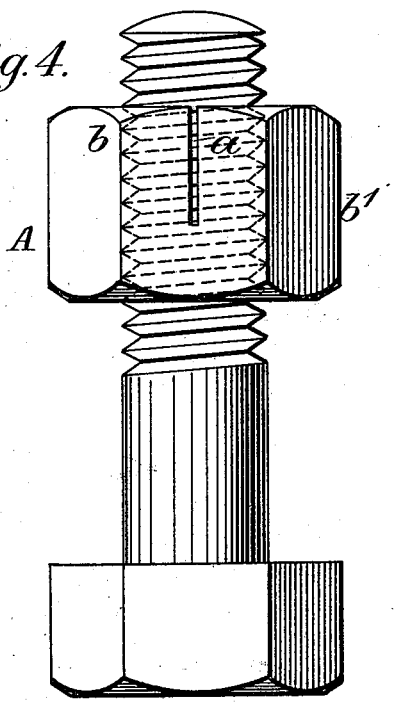
Figure 5:
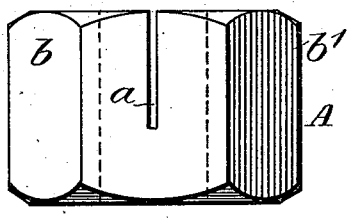
Figure 6:
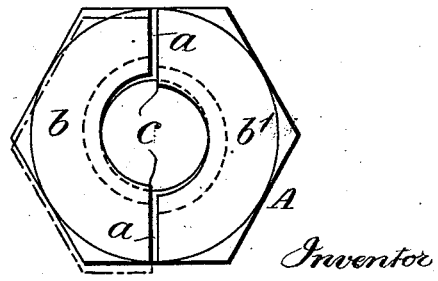

Figure 1 is an elevation, Fig. 2 a plan, and Fig. 3 a cross section on line 1 1 of Fig. 2, showing a square nut constructed according to my invention. Figs. 4 and 5 are elevations and Fig. 6 is a plan of a hexagonal nut also constructed according to my invention. In Fig. 4 the nut is shown in connection with a screw-bolt.

Like letters indicate like parts throughout the drawings.

A is the nut the upper or outer part of which is divided by a vertical cut or division $a$, of a suitable depth, and extending, as shown, diametrically across it, parallel with the axis of the nut. But, if preferred, the said vertical cut may be at a slight angle to the axis of the nut. The cut or division $a$ may be made by cutting or sawing; or the nut may be made from a bar bent into a form approximating in section, to the letter U, say until the two inner surfaces meet; or from a bar rolled or drawn with a longitudinal channel or recess on one side, the two sides of which channel or recess are brought close together in the finishing process.

Before punching and tapping the nut, one of the halves or portions $b$, formed by the cut or division $a$, is pressed, forced, or bent over in the direction of the cut or division or across the other part $b'$, as shown in dotted lines in Figs. 2 and 6, and after the nut has been punched and tapped, said half or portion is returned to its original position. This will cause the portion of the hole in that portion $b$ of the nut, which had been previously pressed, forced or bent, to be eccentric to that in the other portion $b'$ and inclined for about half the depth of the nut to the axis of the bolt, rod, or the like, and to the corresponding part of the hole in the other portion.

When the nut is screwed on to a bolt, rod, or the like, that part of the hole in the portion $b$ of the nut, which is inclined to the axis of the nut, will be forced to assume a position parallel to the axis of the bolt and to its opposite portion, and the cross-spring or resiliency of the two parts $b$ and $b'$ acting on the bolt will cause the nut to grip the bolt and insure its locking thereon, and will thus prevent it from working loose by vibration or other accidental causes.

By bending over the portion $b$ of the nut, in the manner hereinbefore described, each half of the hole at the upper or outer part of the nut where divided, will present an off-set or sharp or cutting edge $c$ to the bolt when turned in one direction, and it is desirable that the portion $b$ of the nut be bent in such a direction with respect to its other portion, that the cutting edge will operate so as to prevent the unscrewing of the nut. Or instead of the nut being first bent over and afterward punched and tapped, it may be first punched and tapped, and one of the portions be bent over by a subsequent operation, in which case the exterior of the nut may be dressed to remove inequalities caused by such bending over.

Having described my invention, what I claim, and desire to secure by Letters Patent, is—

A nut for a screw bolt having an incision or separation entirely across its end or face and about half its thickness, such incision being in line or nearly so with the axis of the bolt and the metal at one side of the incision displaced in its relation to the metal at the other side of the incision, so that the screw threaded surfaces of the hole are off-set one from the other substantially as specified.

In witness whereof I have hereunto signed my name in the presence of two subscribing witnesses.

LORENZO WILLIAM CROSTA.

Witnesses:
WILLIAM WATSON,
*Nottingham.*
C. W. HERN, Junr.,
6 *Victoria Street, Nottingham, England.*